United States Patent
Lehn et al.

(10) Patent No.: US 11,157,746 B2
(45) Date of Patent: Oct. 26, 2021

(54) METHOD AND SYSTEM FOR DETECTING AN ELEVATED OBJECT SITUATED WITHIN A PARKING FACILITY

(71) Applicant: Robert Bosch GmbH, Stuttgart (DE)

(72) Inventors: Andreas Lehn, Ludwigsburg (DE); Felix Hess, Benningen (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/461,682

(22) PCT Filed: Oct. 9, 2017

(86) PCT No.: PCT/EP2017/075634
§ 371 (c)(1),
(2) Date: May 16, 2019

(87) PCT Pub. No.: WO2018/095641
PCT Pub. Date: May 31, 2018

(65) Prior Publication Data
US 2019/0354769 A1 Nov. 21, 2019

(30) Foreign Application Priority Data
Nov. 23, 2016 (DE) .......................... 102016223171.5

(51) Int. Cl.
*G06K 9/00* (2006.01)
*G08G 1/04* (2006.01)
(Continued)

(52) U.S. Cl.
CPC ..... *G06K 9/00758* (2013.01); *G06K 9/00771* (2013.01); *G08G 1/04* (2013.01);
(Continued)

(58) Field of Classification Search
CPC .. G06K 9/00758; G06K 9/00771; G08G 1/04; G08G 1/46; H04N 5/2253;
(Continued)

(56) References Cited

U.S. PATENT DOCUMENTS

| 5,024,571 A | * | 6/1991 | Shahar | B65G 1/0414 |
| | | | | 414/231 |
| 6,285,297 B1 | * | 9/2001 | Ball | G08G 1/14 |
| | | | | 340/932.2 |

(Continued)

FOREIGN PATENT DOCUMENTS

| CN | 1298607 A | 6/2001 |
| CN | 1916936 A | 2/2007 |

(Continued)

OTHER PUBLICATIONS

International Search Report for PCT/EP2017/075634, dated Nov. 28, 2017.

(Continued)

*Primary Examiner* — Brian P Yenke
(74) *Attorney, Agent, or Firm* — Norton Rose Fulbright US LLP; Gerard Messina

(57) ABSTRACT

A method for detecting an elevated object situated within a parking facility, using at least two video cameras that are spatially distributed within the parking facility and whose visual ranges overlap in an overlap area. The method encompasses the following steps: recording particular video images of the overlap area with the aid of the video cameras; analyzing the recorded video images in order to detect an elevated object in the recorded video images, the analysis being carried out internal to the video camera with the aid of at least one of the video cameras, and also external to the video camera with the aid of at least one processing unit that is different from the video cameras. Moreover, a correspond- (Continued)

ing system, a parking facility, and a computer program, are provided.

10 Claims, 4 Drawing Sheets

(51) Int. Cl.
  *H04N 5/225* (2006.01)
  *H04N 5/247* (2006.01)
  *H04N 7/18* (2006.01)
(52) U.S. Cl.
  CPC ........... *H04N 5/2253* (2013.01); *H04N 5/247* (2013.01); *H04N 7/181* (2013.01)
(58) Field of Classification Search
  CPC ................... H04N 5/247; H04N 7/181; G06T 2207/30264; G06T 2207/292
  See application file for complete search history.

(56) References Cited

U.S. PATENT DOCUMENTS

| | | | | |
|---|---|---|---|---|
| 7,116,246 | B2* | 10/2006 | Winter | G08G 1/14 340/932.2 |
| 8,139,115 | B2* | 3/2012 | Barnes | G08G 1/017 340/932.2 |
| 8,878,936 | B2* | 11/2014 | Nerayoff | G06Q 50/30 348/149 |
| 9,076,060 | B2* | 7/2015 | Song | H04N 7/181 |
| 9,129,524 | B2* | 9/2015 | Delibaltov | G06K 9/00785 |
| 9,390,319 | B2* | 7/2016 | Nerayoff | G06K 9/00791 |
| 9,449,236 | B2* | 9/2016 | Wang | G06K 9/00812 |
| 9,852,631 | B2* | 12/2017 | Pennington | G08G 1/147 |
| 9,870,648 | B2* | 1/2018 | Moran | G08G 1/0175 |
| 9,990,550 | B2* | 6/2018 | Kuehnle | G06K 9/00805 |
| 10,007,268 | B2* | 6/2018 | Rexilius | G08G 1/048 |
| 10,368,036 | B2* | 7/2019 | Liu | H04N 7/181 |
| 10,388,164 | B2* | 8/2019 | Lehn | G06K 9/00771 |
| 10,776,632 | B2* | 9/2020 | Lehn | G06K 9/00785 |
| 2001/0020299 | A1* | 9/2001 | Barraclough | H04N 7/141 725/87 |
| 2005/0002544 | A1* | 1/2005 | Winter | G08G 1/14 382/104 |
| 2005/0207876 | A1* | 9/2005 | Springwater | E04H 6/24 414/231 |
| 2009/0089107 | A1* | 4/2009 | Angell | G06Q 10/00 705/7.28 |
| 2011/0182703 | A1* | 7/2011 | Alan | E04H 6/183 414/231 |
| 2012/0039693 | A1* | 2/2012 | Benedict | E04H 6/225 414/231 |
| 2013/0013936 | A1 | 1/2013 | Lin et al. | |
| 2013/0085596 | A1* | 4/2013 | Shani | E04H 6/285 700/217 |
| 2013/0173332 | A1* | 7/2013 | Ho | G06Q 10/06 705/7.27 |
| 2013/0182902 | A1* | 7/2013 | Holz | G06T 7/75 382/103 |
| 2013/0258107 | A1* | 10/2013 | Delibaltov | G08G 1/065 348/148 |
| 2013/0265419 | A1* | 10/2013 | Bulan | G08G 1/147 348/143 |
| 2013/0266188 | A1* | 10/2013 | Bulan | G06K 9/00771 382/104 |
| 2014/0036076 | A1* | 2/2014 | Nerayoff | G06K 9/00791 348/148 |
| 2014/0343842 | A1* | 11/2014 | Ranganathan | G01C 21/30 701/472 |
| 2015/0124093 | A1* | 5/2015 | Wang | G06K 9/00771 348/148 |
| 2016/0078759 | A1* | 3/2016 | Nerayoff | G06T 7/248 701/3 |
| 2016/0110999 | A1* | 4/2016 | Bulan | G06K 9/00771 348/149 |
| 2016/0191884 | A1* | 6/2016 | Chen | H04N 7/181 386/223 |
| 2016/0349408 | A1* | 12/2016 | Suits | G01W 1/10 |
| 2017/0066449 | A1* | 3/2017 | Lee | B60G 17/019 |
| 2017/0076438 | A1* | 3/2017 | Kottenstette | G06K 9/627 |
| 2017/0161915 | A1* | 6/2017 | Walma | H04N 7/181 |
| 2017/0206424 | A1* | 7/2017 | Uchida | H04N 5/247 |
| 2017/0256165 | A1* | 9/2017 | Pennington | G08G 1/142 |
| 2018/0046198 | A1* | 2/2018 | Nordbruch | G05D 1/0282 |
| 2018/0050694 | A1* | 2/2018 | Schroeder | B60W 30/0956 |
| 2018/0236993 | A1* | 8/2018 | Mielenz | B60W 10/20 |
| 2018/0247103 | A1* | 8/2018 | Hsu | G08G 1/04 |
| 2018/0247535 | A1* | 8/2018 | Mielenz | B62D 15/0285 |
| 2018/0359446 | A1* | 12/2018 | Chew | H04N 21/2187 |
| 2019/0014249 | A1* | 1/2019 | Zhu | H04N 5/2327 |
| 2019/0019407 | A1* | 1/2019 | Nakhjavani | G06K 9/00771 |
| 2019/0026566 | A1* | 1/2019 | Lehn | H04N 13/204 |
| 2019/0087877 | A1* | 3/2019 | Tashiro | G08G 1/146 |
| 2019/0226225 | A1* | 7/2019 | Tang | E04H 6/18 |
| 2019/0325225 | A1* | 10/2019 | Hess | G08G 1/04 |
| 2019/0343429 | A1* | 11/2019 | Elhawary | A61B 5/1126 |
| 2020/0050865 | A1* | 2/2020 | Lehn | G08G 1/096725 |

FOREIGN PATENT DOCUMENTS

| | | |
|---|---|---|
| CN | 205354377 U | 6/2016 |
| DE | 19640938 A1 | 4/1998 |
| DE | 69624980 T2 | 7/2003 |
| DE | 102015115266 A1 | 3/2016 |
| DE | 10 2015 201 209 A1 | 7/2016 |
| DE | 102015216908 A1 | 3/2017 |
| EP | 2372627 A2 | 10/2011 |
| EP | 2922042 A1 | 9/2015 |
| JP | 2007183804 A | 7/2007 |
| JP | 2014513642 A | 6/2014 |
| JP | 2016506561 A | 3/2016 |

OTHER PUBLICATIONS

Higuchi, et al.: "Prevention of 3D Object Disappearance in the Overhead View Image Composed of Vehicle-mounted Camera Images", IPSJ SIG Technical Report, vol. 2014-MBL-72 No. 15, vol. 2014-CDS-11 No. 11, (2014), pp. 1-6.

* cited by examiner

METHOD AND SYSTEM FOR DETECTING AN ELEVATED OBJECT SITUATED WITHIN A PARKING FACILITY

FIELD

The present invention relates to a method for detecting an elevated object situated within a parking facility, for example a parking deck, in particular within a driving path of a parking facility. Moreover, the present invention relates to a system for detecting an elevated object situated within a parking facility, for example a parking deck, in particular within a driving path of a parking facility. Moreover, the present invention relates to a parking facility. Furthermore, the present invention relates to a computer program.

BACKGROUND INFORMATION

German Patent Application No. DE 10 2015 201 209 A1 describes a valet parking system for automatically bringing a vehicle from a handover zone to an assigned parking space within a predefined parking area. The conventional system encompasses a parking facility monitoring system with at least one stationary sensor unit. The parking facility monitoring system is designed to locate the vehicles traveling within the predefined parking area.

SUMMARY

An object of the present invention is to provide for efficiently detecting an elevated object situated within a parking facility, for example a parking deck, in particular within a driving path of a parking facility.

This object may be achieved via the respective subject matter of the present invention. Advantageous embodiments of the present invention are described herein.

According to one aspect of the present invention, an example method for detecting an elevated object situated within a parking facility, using at least two video cameras that are spatially distributed within the parking facility and whose visual ranges overlap in an overlap area, is provided, including the following steps:
  recording particular video images of the overlap area with the aid of the video cameras,
  analyzing the recorded video images in order to detect an elevated object in the recorded video images,
  the analysis being carried out internal to the video camera with the aid of at least one of the video cameras, and also external to the video camera with the aid of at least one processing unit that is different from the video cameras.

According to another aspect of the present invention, a system for detecting an elevated object situated within a parking facility is provided, the system being designed for carrying out the method for detecting an elevated object situated within a parking facility.

According to another aspect of the present invention, a parking facility is provided that encompasses the system for detecting an elevated object situated within a parking facility.

According to yet another aspect of the present invention, a computer program is provided that includes program code for carrying out the method for detecting an elevated object situated within a parking facility, when the computer program is executed on a computer, in particular on a processor of a video camera and on a processor of a processing unit.

The present invention is based on the finding that the analysis of the recorded video images is carried out internal to the video camera, i.e., on one or multiple video camera(s) itself/themselves, and also external to the video camera, i.e., on the processing unit. The processing unit is thus designed as an element that is separate from the video cameras. Thus, the processing unit is not integrated into one of the video cameras. The processing unit is thus provided or designed to be separate from, i.e., external to, the video cameras. The processing unit and the video cameras are thus physically different objects.

This yields in particular the technical advantage that the video cameras may be efficiently utilized: recording of the video images and analysis of the video images. The video cameras thus have a dual function.

In particular, redundancy is achieved by the use of at least two video cameras. In particular, errors of one video camera may be compensated for by the other video camera.

This also yields in particular the technical advantage that the reliability is increased by redundant computations (on the video camera and on the processing unit).

The individual results of the particular analyses are, for example, compared to one another to identify errors. This means, for example, that a result of the analysis by the video camera is verified, for example, by a result of the analysis by the processing unit.

The analysis of the video images thus encompasses an analysis of the video images internal to the video camera with the aid of one or multiple video cameras, and an analysis of the video images external to the video camera with the aid of one or multiple processing units.

This yields the technical advantage that a method and system for efficiently detecting an elevated object situated within a parking facility may be provided.

This yields the technical advantage, for example, that false alarms may be reduced or avoided, which advantageously allows efficient operation of the parking facility, and for example, efficient operation of driverless motor vehicles traveling within the parking facility.

This yields the technical advantage, for example, that objects may be efficiently recognized so that a collision with such objects may be prevented.

The phrase "at least one of the video cameras" encompasses in particular the following phrases: "only one of the video cameras", "exactly one of the video cameras", "multiple video cameras", and "all video cameras". This means in particular that the analysis is carried out on one, in particular only one, video camera, or on multiple video cameras. The analysis is thus carried out with the aid of one or multiple video cameras.

For carrying out the analysis, the video camera in question includes, for example, a processor that is designed for analyzing the recorded video images in order to detect an elevated object in the recorded video images.

For example, a video image processing program runs on the processor of the video camera.

The processor of the video camera is designed, for example, to execute a video image processing program.

The phrase "at least one processing unit" encompasses in particular the following phrases: "only one processing unit", "exactly one processing unit", and "multiple processing units".

This means in particular that the analysis is carried out on one, in particular only one, processing unit, or on multiple processing units. The analysis is thus carried out with the aid of one or multiple processing units.

For carrying out the analysis, the processing unit includes, for example, a processor that is designed for analyzing the recorded video images in order to detect an elevated object in the recorded video images.

For example, a video image processing program runs on the processor of the processing unit.

The processor of the processing unit is designed, for example, to execute a video image processing program.

According to one specific example embodiment, the processing unit is part of a cloud infrastructure.

According to one specific embodiment example embodiment, the processing unit is designed as a data processing device.

Within the meaning of the description, a parking facility is in particular a parking facility for motor vehicles. The parking facility is a parking deck or a parking garage, for example. An object to be detected is situated, for example, within a driving path of the parking facility.

An elevated object refers in particular to an object whose height relative to a floor of the parking facility is at least 10 cm.

The elevated object is situated, for example, on a floor of the parking facility, for example on a driving surface or within a travel area, for example within a driving path, of the parking facility. The elevated object is thus situated, for example, within a driving path of the parking facility.

According to one specific embodiment, it is provided that for detecting an elevated object in the recorded video images, the following steps are provided according to the analysis:

rectifying the recorded video images, comparing the particular rectified video images to one another in order to recognize a difference in the recorded overlap areas, detecting an elevated object based on the comparison.

Prior to a comparison of the video images, it is thus provided in particular that the video images are transformed, i.e., rectified, into a specific shared coordinate system, for example a bird's-eye view. The rectified video images are then compared to one another.

When all rectified video images of the overlap area show no differences, i.e., are the same or identical, or have differences that do not exceed a predetermined tolerance value, it may be assumed that no elevated object is situated on the particular visual axis between the overlap area and the video cameras. However, if an elevated object is situated on a visual axis between the overlap area and one of the video cameras, this one video camera does not have the same view as the other video cameras. The rectified video image in question will thus differ from the rectified video image of the other video cameras by an amount that is greater than the predetermined tolerance value. An elevated object may thus be efficiently detected in this way.

A rectification of the recorded video images in particular encompasses or is, for example, a transformation of the recorded video images into the bird's-eye view. This means in particular that the recorded video images are transformed into the bird's-eye view, for example. The subsequent comparison may thus be advantageously carried out in a particularly efficient manner.

Within the meaning of this description, the phrases "same image information" and "identical image information", or "same video images" and "identical video images", in particular also encompass the case that the pieces of image information or the video images have a maximum difference that is within a predetermined tolerance value. Only differences that are greater than the predetermined tolerance value result in a detection of an object. This means in particular that small differences in the brightness information and/or color information are allowed in order to draw the conclusion that the pieces of image information or the video images are the same or identical, provided that the differences are less than the predetermined tolerance value.

This means in particular that, for example, an elevated object is detected only when, for example, the video images differ by an amount that is greater than the predetermined tolerance value. This means in particular that an elevated object is detected only when, for example, one overlap area differs from the other overlap areas by an amount that is greater than the predetermined tolerance value.

According to one specific embodiment, it is provided that the at least one of the video cameras 203 and the processing unit analyze the recorded video images independently of one another.

This yields the technical advantage, for example, that redundancy is efficiently provided. The video camera as well as the processing unit will thus in particular provide an independent result of the analysis. The results in question are, for example, compared to one another, for example with the aid of the processing unit and/or with the aid of the video camera.

If the comparison shows a difference, for example a repetition of the analysis is provided.

Within the meaning of the description herein, a result of the analysis indicates in particular whether or not an elevated object was detected in the recorded video images.

According to another specific embodiment, it is provided that when more than two video cameras are used, the processing unit analyzes particular video images from more video cameras than the at least one of the video cameras.

This yields in particular the technical advantage that the analysis may be carried out efficiently. Since the processing unit has in particular more computing capacity and a faster processor than the video cameras, the processing unit may also analyze more video images than the video camera within the same time period. Thus, for example, two results may be provided within the same time period. Otherwise, it might be necessary to wait for the result of the video camera, which is time-consuming.

This means, for example, that when x video cameras are used, the video camera analyzes video images from y video cameras, whereas the processing unit analyzes video images from z video cameras, where y is less than z, and z is less than or less than or equal to x.

In one specific embodiment, it is provided that a result of the analysis by the at least one of the video cameras is checked with a result of the analysis by the processing unit, with the aid of the processing unit.

This yields the technical advantage, for example, that a malfunctioning video camera may be efficiently detected. It is assumed here that the processing unit is functioning more reliably. This is because the processing unit is generally situated in a protected space that protects the processing unit from harmful influences.

In contrast, video cameras of a parking facility are subject, for example, to weather effects or intentional malicious acts by persons, which, for example, may adversely affect their functionality.

If the check shows that the particular results are the same, it is assumed that the video camera is operating correctly.

Otherwise, it is assumed that the video camera is malfunctioning.

According to one specific embodiment, this means that the processing unit validates a result of the analysis by the video cameras. This means, for example, that two or more video cameras carry out the analysis, and the processing unit validates this analysis.

According to one specific embodiment, it is provided that when an error is identified in the result of the analysis by at least one of the video cameras, with the aid of the processing unit and based on the check, the at least one of the video cameras is switched off or the video images of the at least one of the video cameras are ignored for an analysis for detecting an elevated object, or the at least one of the video cameras is no longer used for carrying out an analysis for detecting an elevated object.

This yields the technical advantage, for example, that a malfunctioning video camera no longer adversely affects the detection of an elevated object.

In one specific embodiment, it is provided that when an error is identified in the result of the analysis by at least one of the video cameras, with the aid of the processing unit and based on the check, with the aid of the processing unit another video camera is specified which is used instead of the at least one of the video cameras.

This yields the technical advantage, for example, that a failure of the video camera may be efficiently compensated for.

According to one specific embodiment, it is provided that when the analysis is carried out with the aid of multiple video cameras, each of the video cameras analyzes the recorded video images independently of one another.

Even if one of the video cameras should fail, a result of the analysis is advantageously available on the other video cameras. This means that an elevated object may always be detected even if a video camera fails.

Redundancy is thus efficiently provided in an advantageous manner.

In one specific embodiment, it is provided that a plurality of video cameras is spatially distributed within the parking facility, at least two video cameras from the plurality of video cameras, whose visual ranges overlap in the overlap area, being selected as the video cameras to be used.

According to this specific embodiment, it is thus provided that more than two video cameras are spatially distributed within the parking facility. In particular, it is known which video camera detects which area of the parking facility. For detecting an area of the parking facility, it is provided that at least two video cameras, each of which may view, i.e., detect, a shared area, the overlap area, are selected from the multiple video cameras.

The selected video cameras record video images of the overlap area, which are analyzed in order to detect an elevated object.

By selecting at least two video cameras that monitor a shared area, the overlap area in the present case, in particular a reliable and robust detection of an elevated object may be achieved.

This yields the technical advantage, for example, that an elevated object situated within the parking facility may be efficiently recognized.

In particular, redundancy is provided by using at least two video cameras. In particular, errors of one video camera may be compensated for by the other video camera.

This yields the technical advantage, for example, that false alarms may be reduced or avoided, which advantageously allows efficient operation of the parking facility and allows, for example, efficient operation of driverless motor vehicles traveling within the parking facility.

This yields the technical advantage, for example, that objects may be efficiently recognized, so that a collision with such objects may be prevented.

In one specific embodiment, it is provided that the analysis of the recorded video images is carried out internal to the video camera with the aid of one or more of the selected video cameras. In particular, the analysis is carried out with the aid of all selected video cameras. In particular, the analysis internal to the video camera is carried out solely with the aid of one or more of the selected video cameras.

This yields the technical advantage, for example, that the video images do not have to be transmitted to nonselected video cameras.

According to another specific embodiment, it is provided that the analysis of the recorded video images internal to the video camera is carried out internal to the video camera with the aid of one or more of the nonselected video cameras. In particular, the analysis internal to the video camera is carried out with the aid of all nonselected video cameras. In particular, the analysis internal to the video camera is carried out solely with the aid of one or more of the nonselected video cameras.

This yields the technical advantage, for example, that the nonselected video cameras are efficiently utilized in order to detect an elevated object.

In one specific embodiment, it is provided that the analysis of the recorded video images is carried out internal to the video camera with the aid of one or more of the selected video cameras, and also internal to the video camera with the aid of one or more of the nonselected video cameras.

According to one specific embodiment, the phrase "at least two video cameras" means at least three video cameras.

According to one specific embodiment, it is provided that the video cameras and the processing unit communicate with one another wirelessly and/or by hard wire.

In particular, the video cameras and the processing unit are in communication connection with one another with the aid of a communications network.

A communications network encompasses, for example, a WLAN network and/or a mobile radio communications network. A wireless communication encompasses, for example, communication according to a wireless communication technology, for example WLAN and/or mobile radio.

A communications network encompasses, for example, an Ethernet network and/or a bus communications network. A hard-wired communication encompasses, for example, communication according to a wired communication technology, for example Ethernet and/or bus communication technology.

In one specific embodiment, it is provided that the video cameras communicate with one another in order to decide which of the video cameras is/are to be used to carry out the analysis of the recorded video images internal to the video camera.

This yields the technical advantage, for example, that no computing capacities external to the video camera have to be provided for this decision.

In one alternative specific embodiment, it is provided that with the aid of the processing unit it is predefined, external to the video camera, which of the video cameras is/are to be used to carry out the analysis of the recorded video images internal to the video camera.

This yields the technical advantage, for example, that no computing capacities internal to the video camera have to be provided for this decision.

According to one specific embodiment, it is provided that the video cameras and the processing unit communicate with one another in order to transmit the particular recorded video images to the video camera(s) and to the processing unit, with the aid of which the analysis is carried out internal to the video camera or external to the video camera.

This yields the technical advantage, for example, that the recorded video images are efficiently provided to the video camera(s) and/or the processing unit with the aid of which the analysis is carried out internal to the video camera or external to the video camera.

In one specific embodiment, it is provided that a result of the analysis is transmitted to a parking facility management server of the parking facility via a communications network.

This yields the technical advantage, for example, that the parking facility management server may efficiently operate the parking facility based on the result.

According to one specific embodiment, it is provided that when there are more than two video cameras, whose visual ranges overlap in the overlap area, the selection of the at least two video cameras from the more than two video cameras encompasses a random selection of one or multiple video cameras from the more than two video cameras.

This yields the technical advantage, for example, that statistical errors may be efficiently compensated for.

According to another specific embodiment, it is provided that when there are more than two video cameras, whose visual ranges overlap in the overlap area, the selection of the at least two video cameras from the more than two video cameras encompasses a selection of one or multiple video cameras from the more than two video cameras, whose respective average visual ranges, which include the center of the particular visual range, are encompassed by the overlap area.

This yields the technical advantage, for example, that imaging errors of lenses of the video cameras, which generally occur in the edge area of the lens, are not able to distort or complicate the analysis of the video images.

In another specific embodiment, it is provided that when there are more than two video cameras, whose visual ranges overlap in the overlap area, the selection of the at least two video cameras from the more than two video cameras encompasses a selection of multiple video cameras from the more than two video cameras that are situated immediately adjacent to one another.

This yields the technical advantage, for example, that the overlap area may be efficiently detected.

According to another specific embodiment, it is provided that when there are more than two video cameras, whose visual ranges overlap in the overlap area, the selection of the at least two video cameras from the more than two video cameras encompasses a selection of multiple video cameras from the more than two video cameras that record the overlap area from the respective oppositely situated sides.

This yields the technical advantage, for example, that elevated objects may be detected from different perspectives, so that they may be efficiently detected in the analysis.

According to another specific embodiment, it is provided that when there are more than two video cameras, whose visual ranges overlap in the overlap area, the selection of the at least two video cameras from the more than two video cameras encompasses a selection of one or multiple video cameras from the more than two video cameras that have a certain minimum resolution and/or a certain processing time for processing the recorded video images.

This yields the technical advantage, for example, that the overlap area may be efficiently detected. This yields the technical advantage, for example, that the analysis may be carried out efficiently.

According to another specific embodiment, it is provided that when there are more than two video cameras, whose visual ranges overlap in the overlap area, the selection of the at least two video cameras from the more than two video cameras encompasses a selection of one or multiple video cameras from the more than two video cameras, which are optimally calibrated among one another.

This yields the technical advantage, for example, that the overlap area may be efficiently detected. This yields the technical advantage, for example, that the analysis may be carried out efficiently.

According to one specific embodiment, it is provided that when there are more than two video cameras, whose visual ranges overlap in the overlap area, the selection of the at least two video cameras from the more than two video cameras encompasses a selection of one or multiple video cameras from the more than two video cameras, whose video images may be analyzed in a predetermined minimum time period.

This yields the technical advantage, for example, that the analysis may be carried out efficiently and quickly.

In another specific embodiment, it is provided that when there are more than two video cameras, whose visual ranges overlap in the overlap area, exactly two video cameras are selected from the more than two video cameras.

This yields the technical advantage, for example, that the overlap area may be efficiently detected. This yields the technical advantage, for example, that the analysis may be carried out efficiently and quickly, provided that only video images from two video cameras are to be analyzed in comparison to an analysis of video images by more than two video cameras.

According to one specific embodiment, it is provided that when there are more than two video cameras, whose visual ranges overlap in the overlap area, all of the more than two video cameras are initially selected, it being ascertained over time, based on which video images of the initially selected video cameras have provided an analysis of the recorded video images with the correct result, and for the one overlap area, only video cameras then being selected from those video cameras whose video images were the basis for an analysis that has provided a correct result.

This yields the technical advantage, for example, that it may be efficiently learned which of the video cameras is best suited to securely and reliably detect an elevated object in a certain area of the parking facility.

According to one specific embodiment, it is provided that when there are more than two video cameras, whose visual ranges overlap in the overlap area, all of the more than two video cameras are selected.

This yields the technical advantage, for example, that the overlap area may be detected efficiently and/or with high accuracy. This yields the technical advantage, for example, that high redundancy, and thus also a reduction, in particular a minimization, of errors may be effectuated.

In another specific embodiment of the present invention, it is provided that when, within the scope of the analysis, an intermediate result is ascertained that is correct within a predetermined minimum probability, the analysis is aborted, regardless of whether or not all video images are analyzed, so that the analysis is also aborted when not all of the video images have yet been analyzed.

This yields the technical advantage, for example, that the analysis may be efficiently carried out. This yields the technical advantage, for example, that a processor load for the analysis may be efficiently reduced.

In one specific embodiment of the present invention, it is provided that the particular video images of the video cameras are analyzed successively, i.e., not concurrently, an abort criterion being established, and when the abort criterion is present, the analysis of the video images being aborted, even if not all of the video images have yet been analyzed.

For example, one abort criterion is that if after x (settable value) analyses of the particular video images of the selected video cameras, an intermediate result that is correct within a predetermined minimum probability is ascertained y times (settable value), the analysis of the particular video images of the remaining video cameras is aborted. The analysis is thus terminated prematurely if the abort criterion is met.

This always applies, for example, for a position (represented, for example, by 1 pixel on the particular video image and/or the smallest resolvable physical unit, for example 1 cm×1 cm), and/or for a contiguous area (for example, 5 pixels×5 pixels and/or 5 cm×5 cm). When, for example, in an area of the particular video images (for example, x pixels×x pixels, or in cm, x cm×x cm), the image areas are "equal" or "not equal" (abort criterion), in particular the analysis is aborted. This abort criterion may be applied to different areas. The smaller the area, the higher the accuracy, but also the more intensive the computations. This means that a certain area (x pixels×x pixels or x cm×x cm) in the video images (when the area is given in pixels) or in the real world (when the area is given in cm) is specified, and when the particular analyses of these areas in the video images provides an equivalent result ("equal" or "not equal", i.e., different), the analysis in particular is aborted and is not continued.

The number and the selection of the individual views (corresponding to the video cameras) is different, for example, for each position and/or each area.

According to one specific embodiment of the present invention, it is provided that it is ascertained for the first time which video camera can record which area of the parking facility, a result of the first-time ascertainment being checked by repeating the ascertainment of which video camera can record which area of the parking facility.

This yields the technical advantage, for example, that the overlap area may be efficiently detected. This yields the technical advantage, for example, that changes in the video camera positions may be efficiently recognized and then also taken into account. This yields the technical advantage, for example, that responses may be efficiently made to manufacturing tolerances of the video cameras, which, for example, result in a change in a position of the visual field.

In one specific embodiment, it is provided that the result of the first-time ascertainment is checked prior to each analysis of recorded video images, for at least those video cameras whose video images are to be analyzed.

This yields the technical advantage, for example, that distortion or complication of the analysis due to changes in the video camera positions may be efficiently prevented.

According to one specific embodiment, it is provided that the overlap area relative to at least one video camera is illuminated differently compared to the other video cameras.

This yields the technical advantage, for example, that an object may be efficiently detected. This is due to the fact that if one side of the object is illuminated preferentially or differently than other sides of the object, differences in the recorded video images may be recognized in a particularly easy and efficient manner.

That the overlap area relative to at least one video camera is illuminated differently compared to the other video camera means, for example, that a light source that illuminates the overlap area from the direction of the at least one video camera is situated within the parking facility. There is no illumination from the directions of the other video cameras, for example; i.e., no additional light sources are provided, or different illuminations are provided, for example light sources that are operated at different light intensities.

According to one specific embodiment, it is provided that the overlap area encompasses a travel area for motor vehicles.

This yields the technical advantage, for example, that the travel area may be efficiently monitored.

According to one specific embodiment, it is provided that the comparison encompasses comparing a particular brightness of the rectified video images in order to recognize differences in brightness as a difference.

This yields in particular the technical advantage that differences in the recorded overlap areas may be efficiently recognized.

According to one specific embodiment, it is provided that the parking facility is configured or designed for executing or carrying out the method for detecting an elevated object situated within a parking facility.

According to one specific embodiment, it is provided that the method for detecting an elevated object situated within a parking facility is executed or carried out with the aid of the system for detecting an elevated object situated within a parking facility.

Technical functionalities of the system result analogously from corresponding technical functionalities of the method, and vice versa.

This means in particular that system features result from corresponding method features, and vice versa.

According to one specific embodiment, it is provided that at least n video cameras are provided, where n is greater than or equal to 3.

According to one specific embodiment, an illumination device is provided. The illumination device is designed for illuminating the overlap area relative to at least one video camera differently compared to the other video cameras.

The illumination device encompasses, for example, one or multiple light sources that are spatially distributed within the parking facility. The light sources are situated in such a way, for example, that the overlap area is illuminated differently from different directions.

In one specific embodiment, it is provided that the overlap area is illuminated in the manner of a spotlight from a preferred direction, for example with the aid of the illumination device.

In one specific embodiment, it is provided that the overlap area is illuminated from a single direction.

The light sources are situated, for example, on a ceiling and/or on a pillar and/or on a wall, generally on an infrastructure element of the parking facility.

According to one specific embodiment, it is provided that at least n video cameras are used, where n is greater than or equal to 3.

According to one specific embodiment, it is provided that a particular overlap area is monitored by exactly three or exactly four video cameras, whose visual ranges overlap in the particular overlap area.

In one specific embodiment, it is provided that multiple video cameras are provided, whose visual ranges overlap in an overlap area. This means in particular that multiple overlap areas are detected, in particular monitored, here with the aid of multiple video cameras.

The phrase "respective" encompasses in particular the phrase "and/or".

According to one specific embodiment, it is provided that one or multiple or all video cameras is/are situated at a height of at least 2 m, in particular 2.5 m, relative to a floor of the parking facility.

This yields the technical advantage, for example, that the overlap area may be efficiently recorded.

According to one specific embodiment, it is provided that the video camera(s), with the aid of which the analysis internal to the video camera is carried out, is/are selected based on one or multiple processing criteria.

This yields the technical advantage, for example, that the video cameras may be efficiently selected.

According to yet another specific embodiment, it is provided that the processing criterion/criteria is/are selected from the following group of processing criteria: the particular computing capacity of the video cameras, the particular memory utilization of the video cameras, the particular transmission bandwidth for the video cameras, the particular power consumption of the video cameras, the particular computing power of the video cameras, the particular computing speed of the video cameras, and the particular instantaneous operating mode of the video cameras.

This yields the technical advantage, for example, that the video cameras may be efficiently selected.

In one specific embodiment, it is provided that the processing criterion is compared to a predetermined processing criterion threshold value, the video camera or the video cameras being selected based on a result of the comparison.

For example, only video cameras are selected whose particular computing capacity is greater than or greater than or equal to a computing capacity threshold value.

For example, only video cameras are selected whose particular memory utilization is less than or less than or equal to a memory utilization threshold value.

For example, only video cameras are selected for which a transmission bandwidth is greater than or greater than or equal to a transmission bandwidth threshold value.

For example, only video cameras are selected whose particular power consumption is less than or less than or equal to a power consumption threshold value.

For example, only video cameras are selected whose particular computing power is greater than or greater than or equal to a computing power threshold value.

For example, only video cameras are selected whose particular computing speed is greater than or greater than or equal to a computing speed threshold value.

For example, only video cameras are selected whose particular instantaneous operating mode corresponds to an activated operating mode. An activated operating mode is not a standby mode.

The present invention is explained in greater detail below with reference to preferred exemplary embodiments.

DETAILED DESCRIPTION OF EXAMPLE EMBODIMENTS

Figure 1:
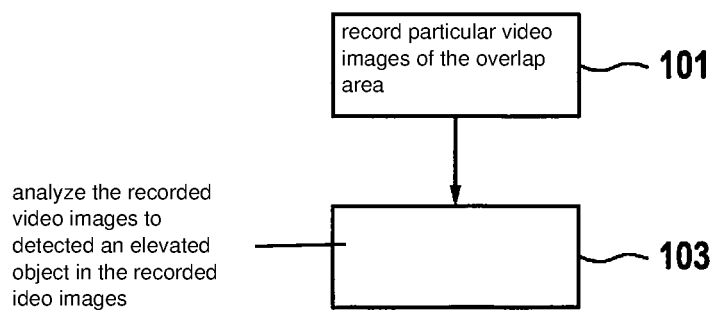
FIG. 1 shows a flow chart of a method for detecting an elevated object situated within a parking facility.

The same reference numerals may be used for identical features in the following description.

FIG. 1 shows a flow chart of a method for detecting an elevated object situated within a parking facility, using at least two video cameras that are spatially distributed within the parking facility, and whose visual ranges overlap in an overlap area.

The method encompasses the following steps:
  recording 101 particular video images of the overlap area with the aid of the video cameras,
  analyzing 103 the recorded video images in order to detect an elevated object in the recorded video images,
  analysis 103 being carried out internal to the video camera with the aid of at least one of the video cameras, and also external to the video camera with the aid of at least one processing unit that is different from the video cameras.

A detected elevated object may be classified as follows, for example: motor vehicle, pedestrian, cyclist, animal, baby stroller, other.

Figure 2:
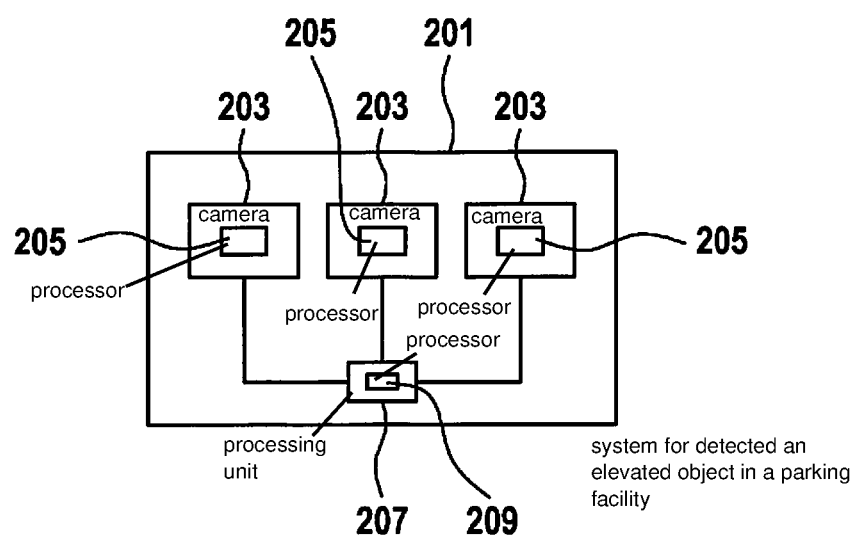
FIG. 2 shows a system for detecting an elevated object situated within a parking facility.

FIG. 2 shows a system 201 for detecting an elevated object situated within a parking facility. System 201 is designed for executing or carrying out the method for detecting an elevated object situated within a parking facility.

System 201 encompasses, for example, a plurality of video cameras 203, spatially distributed within the parking facility, for recording video images. Video cameras 203 each include a processor 205 for analyzing the recorded video images internal to the video camera in order to detect an elevated object in the recorded video images.

System 201 also encompasses a processing unit 207 that is different from video cameras 203. This means in particular that processing unit 207 is not integrated into one of video cameras 203, and instead is provided externally, i.e., separately, from video cameras 203.

Processing unit 207 includes a processor 209 for analyzing the recorded video images external to the video camera in order to detect an elevated object in the recorded video images.

Video cameras 203 transmit their recorded video images to processing unit 207 via a communications network, for example.

System 201 is designed in particular for carrying out the following steps:
  selecting at least two video cameras 203 from the plurality of video cameras 203, whose visual ranges overlap in an overlap area,
  recording a particular video image of the overlap area with the aid of selected video cameras 203,
  analyzing the recorded video images internal to the video camera with the aid of a processor 205 or with the aid of multiple processors 205 in order to detect an elevated object in the recorded video images.

In one specific embodiment, system 201 encompasses multiple processing units. Statements concerning one processing unit similarly apply to multiple processing units, and vice versa.

It is provided that the analysis of the recorded video images is carried out on one or more of the video cameras 203, and also on the external processing unit. An analysis with the aid of the external processing unit is explicitly provided.

Processing unit 207 may also be referred to as a data processing device.

Figure 3:
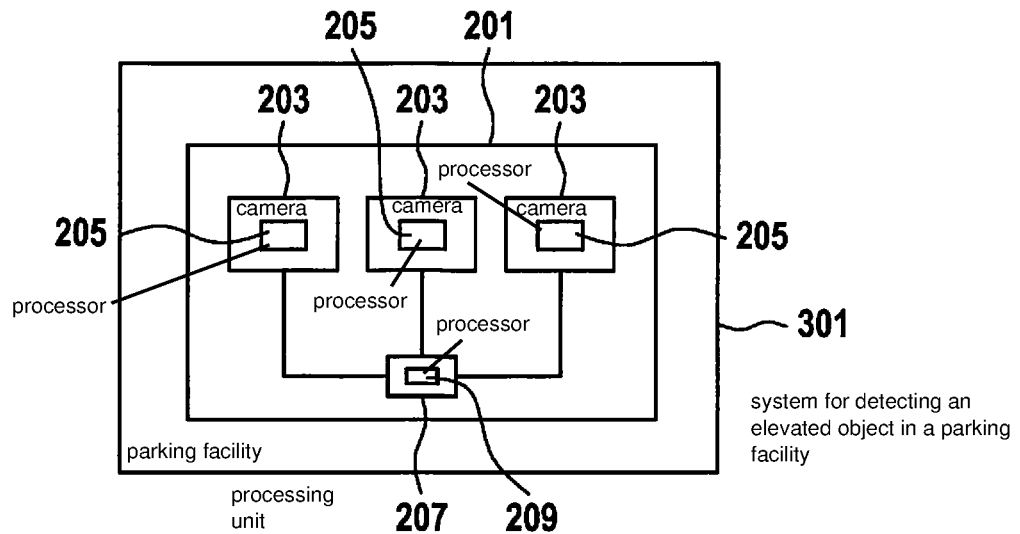
FIG. 3 shows a first parking facility.

FIG. 3 shows a parking facility 301.

Parking facility 301 encompasses system 201 of FIG. 2.

At this point it is noted that, although the individual elements shown in FIGS. 2 and 3 are graphically connected by lines, this is not to be construed in the limiting sense that the individual elements are connected to one another by hard wire. According to one specific embodiment, the individual elements are connected to one another via a communications network. The communications network encompasses, for example, a wireless and/or hard-wired communications network. The individual elements may thus communicate with one another in a wireless and/or hard-wired manner.

Figure 4:
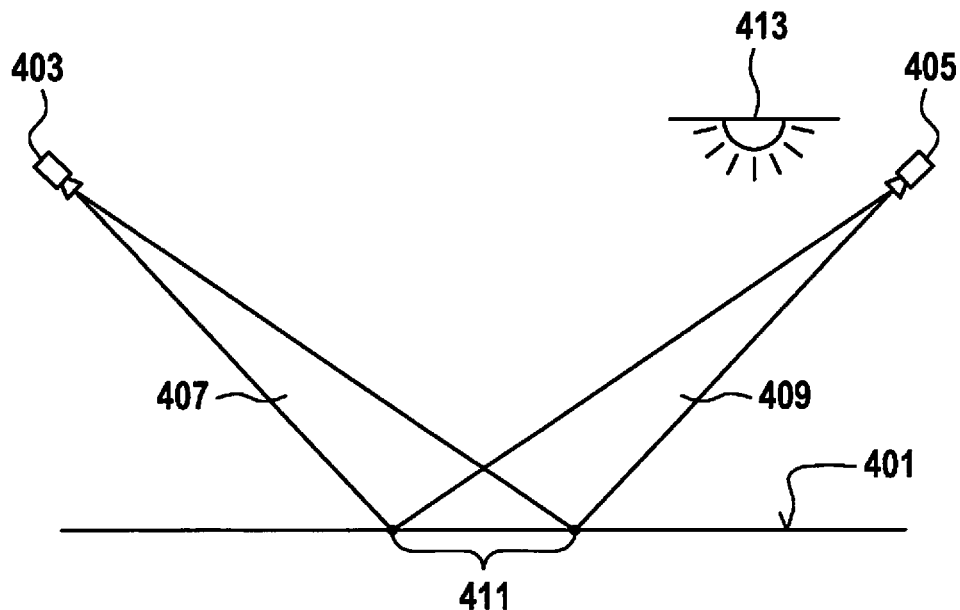
FIG. 4 shows two video cameras that monitor a floor of a parking facility.

FIG. 4 shows a first video camera 403 and a second video camera 405 that monitor a floor 401 of a parking facility. The two video cameras 403, 405 are situated on a ceiling, for example (not shown).

First video camera 403 has a first visual range 407. Second video camera 405 has a second visual range 409. The two video cameras 403, 405 are situated in such a way that the two visual ranges 407, 409 overlap in an overlap area 411. This overlap area 411 is part of floor 401.

Situated directly to the left of second video camera 405 is a light source 413 that illuminates overlap area 411 from the direction of second video camera 405.

No elevated object is situated on floor 401. This means that both video cameras 403, 405 view or detect the same overlap area 411. This means that the two video cameras 403, 405 recognize or view the same image information of overlap area 411.

The two video cameras 403, 405 each record video images of overlap area 411, and the video images are rectified. If no elevated object is situated between overlap area 411 and video cameras 403 and 405, the particular rectified video images do not differ from one another, at least not within a predefined tolerance (the predetermined tolerance value). In this case, no difference is recognized, so that also no elevated object is detected.

Overlap area 411 is situated, for example, on a travel area of the parking facility. This means, for example, that motor vehicles may travel on overlap area 411.

Figure 5:
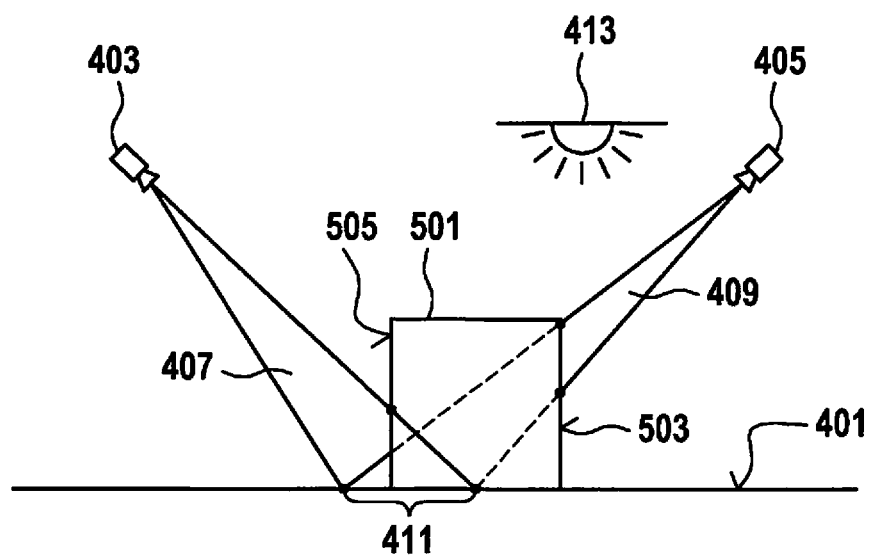
FIG. 5 shows the two video cameras of FIG. 4 during the detection of an elevated object.

FIG. 5 shows the two video cameras 403, 405 during the detection of an elevated object 501. Elevated object 501 has oppositely situated sides 503, 505: Side 503 is referred to below as the right side (relative to the plane of the drawing). Side 505 is referred to below as the left side (relative to the plane of the drawing).

Elevated objects generally look different from different sides. This means that elevated object 501 looks different from right side 503 than from left side 505.

Elevated object 501 is situated on floor 401. Elevated object 501 is situated between overlap area 411 and the two video cameras 403, 405.

First video camera 403 detects left side 505 of elevated object 501. Second video camera 405 detects right side 503 of elevated object 501.

In this case, the particular rectified video images differ from one another, so that a difference may be recognized. Elevated object 501 is then detected. In this case, the differences are greater than the predetermined tolerance value.

In particular as the result of providing light source 413, right side 503 is illuminated more intensely than left side 505. This yields the technical advantage, for example, that the brightnesses of the recorded, and thus also rectified, video images differ. Differences in brightness may be efficiently detected, so that the difference may be efficiently recognized so that elevated object 501 may advantageously be efficiently detected.

Elevated object 501 is, for example, a motor vehicle that is traveling on floor 401 of the parking facility. Sides 503, 505 are, for example, front and rear sides, or the right and left sides, of the motor vehicle.

If a nonelevated, i.e., two-dimensional or flat, object is situated on floor 401, the correspondingly rectified video images generally do not differ from one another within a predefined tolerance. Such a two-dimensional object is a newspaper, a piece of paper, or leaves, for example. The fact that in such a case, although an object, even if it is not an elevated object, is situated on floor 401 and is possibly not detected in the rectified video images due to the lack of a difference (differences are less than or less than or equal to the predefined tolerance value), in this regard is not relevant here for safety reasons, since motor vehicles may generally travel over such nonelevated objects. Motor vehicles may travel over leaves or paper without resulting in a hazardous situation or collision, in contrast to an elevated object, which may be a pedestrian, a cyclist, an animal, or a motor vehicle, for example. A motor vehicle should not collide with such objects.

Video images are recorded with the aid of video cameras 403, 405 and analyzed according to the above discussion in order to detect an elevated object in the video images.

The concept according to the present invention is based on the fact that the analysis of the video images is carried out by the video cameras or by one of the video cameras themselves/itself, and also by an external processing unit. The video cameras thus transmit their recorded video images to the video camera or video cameras that is/are to carry out the analysis, and to the processing unit. The transmission encompasses, for example, transmission of the video images via a communications network, which for example encompasses a wireless and/or a hard-wired communications network.

The more video cameras that independently analyze the video images, the greater the likelihood of a correct and reliable result, although at the cost of computational intensity, for example a processor load or duration of the computations.

The information that an object has been detected is reported or transmitted, for example, to a parking facility management system that encompasses the parking facility management server. The parking facility management system uses this information, for example, for planning or managing an operation of the parking facility. The parking facility management system thus operates, for example, the parking facility based on the information.

This information is used, for example, for remote control of a motor vehicle situated within the parking facility. This means, for example, that the parking facility management system remotely controls a motor vehicle within the parking facility, based on the detected object(s).

This information is transmitted, for example, to motor vehicles autonomously driving within the parking facility via a wireless communications network.

The present invention is thus based in particular on the concept of using multiple video cameras that are spatially distributed within a parking facility, which may be designed as a parking deck or as a parking garage, for example, in such a way that, for example, each point of a travel area is viewed or detected and/or monitored by at least two, for example at least three, video cameras. This means that the particular visual ranges overlap in overlap areas in each case, the overlap areas covering the travel area. The recorded video images are rectified, for example prior to the comparison.

The corresponding rectified video images of the video cameras are compared to one another, for example with the aid of an image processing algorithm. For example, it is provided that if all video cameras in the travel area view the same image information at a certain location or at a certain point, it is determined that no object is situated on the particular line of sight between the certain location and the video cameras. In this regard, an object is not detected either. However, according to one specific embodiment, if the image information of one video camera at this location differs from the other video cameras, it is thus clear that an elevated object must be situated on the line of sight of this one video camera. In this regard, an elevated object is detected.

Within the meaning of this description, the phrases "same image information" and "identical image information" in particular also encompass the case that the pieces of image information differ maximally by a predetermined tolerance value. Only differences that are greater than the predetermined tolerance value result in detection of an object. This means in particular that small differences in the brightness information and/or color information are allowed in order to draw the conclusion that the pieces of image information are the same or identical, provided that the differences are smaller than the predetermined tolerance value.

This means in particular, for example, that a tolerance is predefined, about which the rectified video images are allowed to differ without an elevated object being detected. Only when the differences are greater than the predefined tolerance is an elevated object detected.

According to one specific embodiment, this means in particular that an object is detected only when the differences in the rectified video images are greater than a predefined tolerance or a predetermined tolerance value.

The present invention is in particular advantageously model-free with regard to the objects to be recognized. The algorithm uses, for example, only model knowledge concerning the parking facility, i.e., where peripheries of the parking facility (floors, walls, or pillars, for example) are situated in the travel area.

For example, it is provided that a motor vehicle that is driving autonomously or by remote control moves within the parking facility on predefined surfaces, the travel area. The video cameras are situated in such a way, for example, that their visual ranges overlap in the travel area. This overlap is selected in such a way that each point on the periphery (floor, wall, for example) in the travel area is viewed or monitored by at least three video cameras. In particular, the arrangement is selected in such a way that each point on the periphery is viewed or monitored from a different perspective.

This means in particular that the overlap area is detected and recorded from different directions with the aid of the video cameras.

From each individual point of the periphery, the lines of sight to, for example, the three video cameras that view this point may be traced. If more video cameras are to be available, it is provided, for example, that of the multiple cameras, three video cameras with preferably different perspectives are selected.

If no elevated object is situated on the lines of sight of the video cameras at this point, all video cameras view the same piece(s) of image information of the periphery (see FIG. 4), which differ maximally by a predetermined tolerance value.

For example, if a brightness or a color of the surface of the floor changes, for example if the floor is wet due to the introduction of moisture, this does not interfere with a detection of the periphery, provided that all video cameras view the same changed brightness or color. For example, if a two-dimensional object, such as a newspaper, piece of paper, or leaves, is situated on the floor, according to the concept according to the present invention this nonelevated object is generally not detected, since all video cameras view the same piece(s) of image information that differ(s) maximally by a predetermined tolerance value. This is not critical for safety reasons, since such two-dimensional objects may be easily traveled over by motor vehicles.

If an elevated object is situated in the travel area (see FIG. 5, for example), the lines of sight of the video cameras no longer strike the periphery (overlap area) as expected, and instead see different views of the elevated object and therefore record different video images.

An elevated object is a person or a motor vehicle, for example.

For example, one video camera thus views the front side of the object, while the other video camera views the rear side of the object. The two sides generally differ significantly, and the elevated object may thus be detected if the recorded video images are different. This effect may be intensified, for example, by a brighter illumination of the scene, i.e., the overlap area, on one side, so that failure to notice elevated objects may be efficiently ruled out. Due to a different illumination of the various sides of an object, this object appears brighter on the more intensely illuminated side than on the weakly illuminated side, so that the video cameras view different pieces of image information. This applies even for monochrome objects.

Figure 6:
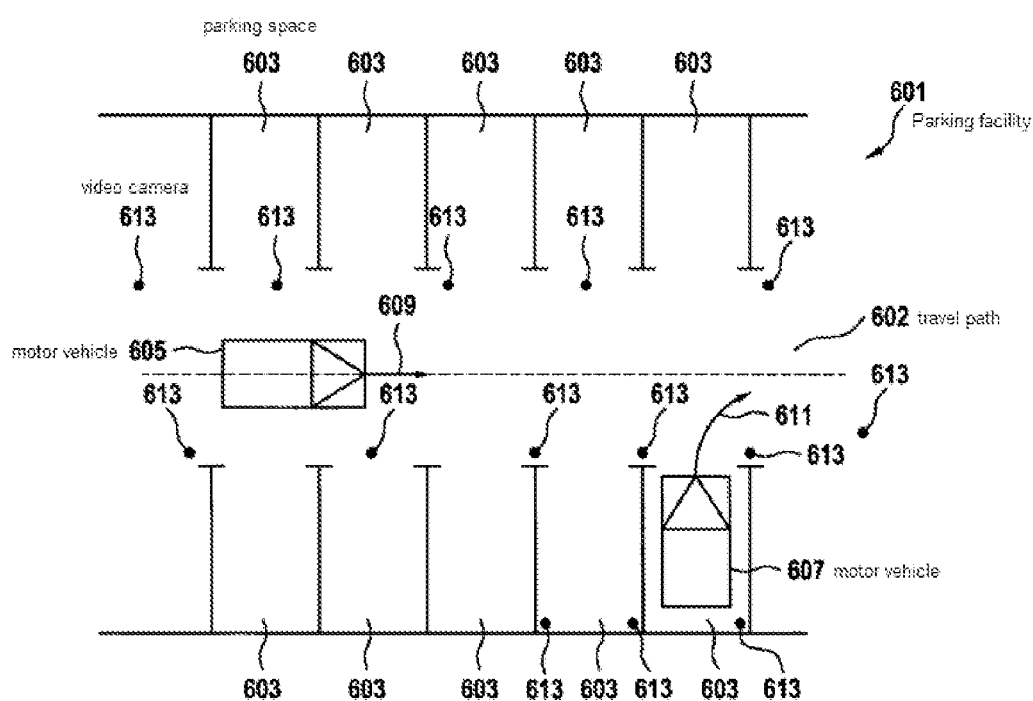
FIG. 6 shows a second parking facility.

FIG. 6 shows a second parking facility 601.

Parking facility 601 encompasses multiple parking spaces 603 situated transversely with respect to a travel path 602 on which a first motor vehicle 605 travels. A second motor vehicle 607 is parked in one of parking spaces 603.

First motor vehicle 605 travels in arrow direction 609 from left to right, relative to the plane of the drawing.

Second motor vehicle 607 intends to unpark, as indicated by an arrow with reference numeral 611.

Multiple video cameras 613 are spatially distributed within the parking facility. Video cameras 613 are schematically denoted as solid circles.

Video cameras 613 are situated, for example, in an offset manner to the right and the left at an edge of travel path 602. Video cameras 613 are in each case situated, for example, in corners of parking spaces 603.

Video cameras 613 are situated, for example, at a drop-off position at which a driver of a motor vehicle drops off his/her motor vehicle for an automatic parking operation (automated valet parking (AVP)). The motor vehicle dropped off there thus begins the automatic parking, starting at the drop-off position.

From that point on, the motor vehicle thus drives automatically, in particular autonomously or by remote control, to one of parking spaces 603 and parks there.

Video cameras 613 are situated, for example, at a pick-up position at which a driver may pick up his/her motor vehicle after the end of an AVP operation. After the end of a parking period, the motor vehicle parked in a parking space 603 drives automatically, in particular autonomously or by remote control, to the pick-up position and parks there.

The pick-up position is, for example, identical to the drop-off position or is, for example, different from the drop-off position.

Efficient monitoring of traffic, in particular traffic of automatically driving motor vehicles, i.e., in particular driverless motor vehicles, is thus made possible with the aid of video cameras 613.

The present invention provides detection of the motor vehicles, and on this basis provides, for example, control of the motor vehicles. For example, first motor vehicle 605 is detected. In particular, second motor vehicle 607 is detected. In particular it is recognized that second motor vehicle 607 intends to unpark. In particular it is recognized that first motor vehicle 605 is traveling from left to right. In particular a possible collision is recognized. In particular, second motor vehicle 607 is appropriately stopped by remote control until first motor vehicle 605 has traveled past second motor vehicle 607.

These steps of recognition are based in particular on the analysis of the video images by appropriately selected video cameras. For the sake of clarity, no processing unit for the video-external analysis is denoted in FIG. 6.

The present invention advantageously allows elevated objects to be efficiently detected or recognized. The concept according to the present invention is in particular very robust against changes in brightness or changes in brightness at specific points, for example due to solar radiation.

The information that an elevated object is detected may be transferred, for example, to a higher-order control system. This control system may, for example, stop a remote-controlled motor vehicle or transmit a stop signal to an autonomously driving motor vehicle, so that these motor vehicles can still stop in time in front of the elevated object. The control system is encompassed by the parking facility management system, for example.

The present invention may thus also be advantageously used in the AVP field. "AVP" stands for "automated valet parking" and may also be referred to as "automatic parking operation". Within the scope of such an AVP operation, it is provided in particular that motor vehicles are automatically parked within a parking facility, and after the end of a parking period are automatically driven from their parking position to a pick-up position, at which the motor vehicle may be picked up by its owner.

What is claimed is:

1. A method for detecting an elevated object situated within a parking facility, using at least two video cameras that are spatially distributed within the parking facility and whose visual ranges overlap in an overlap area, the method comprising the following steps:
    recording particular video images of the overlap area using the video cameras; and
    analyzing the recorded video images to detect an elevated object in the recorded video images, the analysis being carried out internal to the video camera using at least one of the video cameras, and also external to the video camera using at least one processing unit that is different from the video cameras,
    wherein the elevated object includes an object whose height relative to a floor of the parking facility is at least 10 cm,
    wherein for detecting an elevated object in the recorded video images, the following steps are performed according to the analysis:
    rectifying the recorded video images;
    transforming the video images into a bird's-eye view coordinate system;
    comparing the particular rectified video images to one another in order to recognize a difference in the recorded overlap areas; and
    detecting an elevated object based on the comparison.

2. The method as recited in claim 1, wherein the at least one of the video cameras and the processing unit analyze the recorded video images independently of one another.

3. The method as recited in claim 1, wherein the video cameras include more than two video cameras, the processing unit analyzing video images from more video cameras than the at least one of the video cameras.

4. The method as recited in claim 1, wherein a result of the analysis by the at least one of the video cameras is checked with a result of the analysis by the processing unit, with the aid of the processing unit.

5. The method as recited in claim 4, wherein, when an error is identified in the result of the analysis by at least one of the video cameras, with the aid of the processing unit and based on the check, the at least one of the video cameras is switched off or the video images of the at least one of the video cameras are ignored for an analysis for detecting an elevated object, or the at least one of the video cameras is no longer used for carrying out an analysis for detecting an elevated object.

6. The method as recited in claim 5, wherein with the aid of the processing unit another video camera is specified which is used instead of the at least one of the video cameras.

7. The method as recited in claim 1, wherein the overlap area relative to at least one of the at least two video cameras is illuminated differently compared to another video camera of the at least two video cameras.

8. A system for detecting an elevated object situated within a parking facility, the system being configured to detect an elevated object situated within a parking facility, the system including at least two video cameras that are spatially distributed within the parking facility and whose visual ranges overlap in an overlap area, the system configured to:
    record particular video images of the overlap area using the video cameras; and
    analyze the recorded video images to detect an elevated object in the recorded video images, the analysis being carried out internal to the video camera using at least one of the video cameras, and also external to the video camera using at least one processing unit that is different from the video cameras,
    wherein the elevated object includes an object whose height relative to a floor of the parking facility is at least 10 cm,
    wherein for detecting an elevated object in the recorded video images, the following steps are performed according to the analysis:
    rectifying the recorded video images;
    transforming the video images into a bird's-eye view coordinate system;
    comparing the particular rectified video images to one another in order to recognize a difference in the recorded overlap areas; and
    detecting an elevated object based on the comparison.

9. A parking facility that has a system for detecting an elevated object situated within a parking facility, the system being configured to detect an elevated object situated within the parking facility, the system including at least two video cameras that are spatially distributed within the parking facility and whose visual ranges overlap in an overlap area, the system configured to:
    record particular video images of the overlap area using the video cameras; and
    analyze the recorded video images to detect an elevated object in the recorded video images, the analysis being carried out internal to the video camera using at least one of the video cameras, and also external to the video camera using at least one processing unit that is different from the video cameras,
wherein the elevated object includes an object whose height relative to a floor of the parking facility is at least 10 cm,
    wherein for detecting an elevated object in the recorded video images, the following steps are performed according to the analysis:
    rectifying the recorded video images;
    transforming the video images into a bird's-eye view coordinate system;
    comparing the particular rectified video images to one another in order to recognize a difference in the recorded overlap areas; and
    detecting an elevated object based on the comparison.

10. A non-transitory computer-readable storage medium on which is stored a computer program that includes program code for detecting an elevated object situated within a parking facility, using at least two video cameras that are spatially distributed within the parking facility and whose visual ranges overlap in an overlap area, the computer program, when executed by a computer, causing the computer to perform the following steps:
    recording particular video images of the overlap area using the video cameras; and
    analyzing the recorded video images to detect an elevated object in the recorded video images, the analysis being carried out internal to the video camera using at least one of the video cameras, and also external to the video camera using at least one processing unit that is different from the video cameras,
wherein the elevated object includes an object whose height relative to a floor of the parking facility is at least 10 cm,
    wherein for detecting an elevated object in the recorded video images, the following steps are performed according to the analysis:
    rectifying the recorded video images;
    transforming the video images into a bird's-eye view coordinate system;
    comparing the particular rectified video images to one another in order to recognize a difference in the recorded overlap areas; and
    detecting an elevated object based on the comparison.

\* \* \* \* \*